June 12, 1934.  W. E. BEEDE  1,962,855
ELECTRICAL MEASURING INSTRUMENT
Filed Dec. 27, 1932
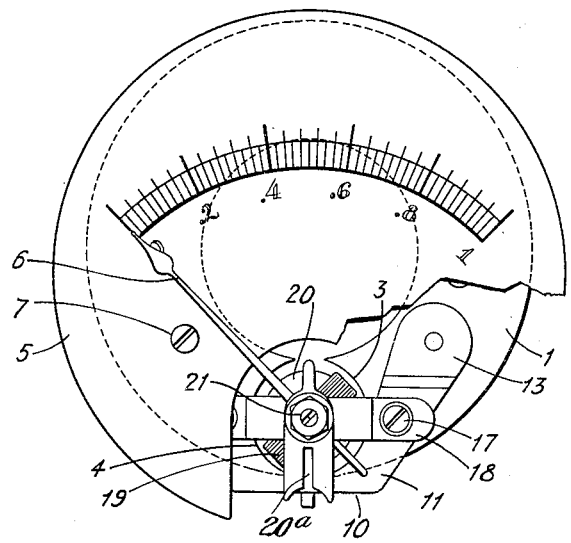
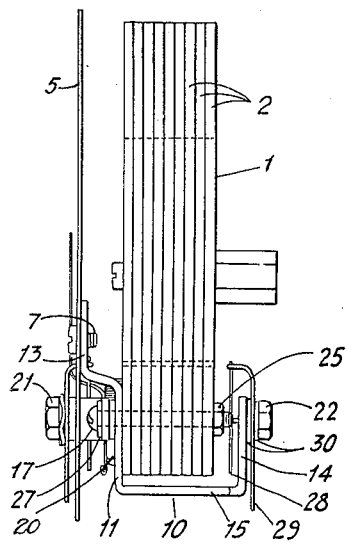
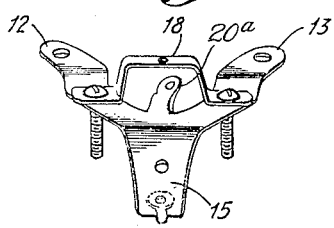
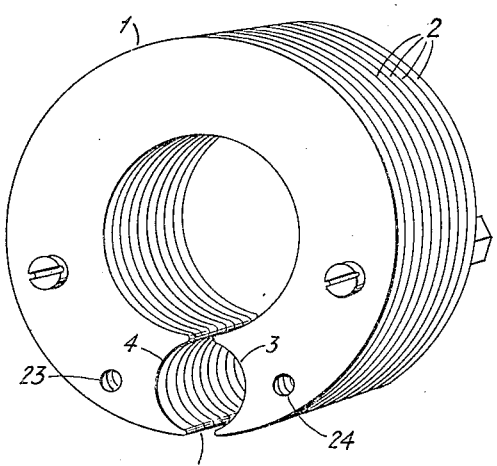
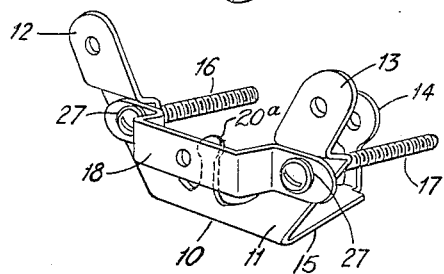
INVENTOR
WALTER E. BEEDE
BY Charles H. Brown
ATTORNEY Patented June 12, 1934

1,962,855

UNITED STATES PATENT OFFICE 1,962,855

ELECTRICAL MEASURING INSTRUMENT

Walter E. Beede, Penacook, N. H.

Application December 27, 1932, Serial No. 648,840

2 Claims. (Cl. 171—95)

This invention relates to electrical measuring instruments of the D'Arsonval type in which a movable coil is pivotally mounted in a magnetic field.

In the construction and manufacture of the D'Arsonval type of meter, it is well known that the movable coil element, which is located between the pole pieces of the permanent magnet, and its core member, are so aligned that there is relatively no movement either of the coil element or its core sideways with respect to the pole pieces; a requirement which is necessary to obtain accuracy of measurement and ruggedness of construction. To effect this result, it has been customary in the past to mount the core together with its movable coil element in the instrument between metallic brackets and/or cross arms which were fastened to the magnet or the pole pieces thereof by numerous screws on both sides of the magnet material in such manner as to insure ruggedness and permanency of construction. It has been found, however, that such mode of construction is costly and does not lend itself readily to maintenance. Experience has shown that to dismantle the instrument in order to replace or repair the movable coil element in this type of meter requires a great deal of time on the part of the operator and makes for an expensive instrument.

Accordingly, an object of the present invention is to overcome these disadvantages and to provide a rugged and highly accurate instrument which can be conveniently and economically manufactured and assembled.

A further object of the invention is to provide an improved type of instrument wherein the movable coil element may be readily removed and replaced as a unit.

In general, the invention contemplates the use, as a unit, of a removable and conveniently accessible coil assemblage consisting, essentially, of a movable coil element which is pivotally supported in bearings, the entire assemblage being supported by a mounting which is adapted to be secured to the permanent magnet of the instrument. This mounting is provided in one embodiment with prongs for easy insertion into holes passing through the magnet, the prongs being suitably threaded at their ends for enabling the entire assemblage to be fastened to the magnet by means of nuts. In another embodiment the prongs are replaced by short screws which, by means of holes extending at least partially through the magnet, secure the mounting to the magnet.

A particular feature of the invention comprises a novel type of supporting bracket which supports the entire assemblage and to which the prongs (or screws) and dial face are secured. This bracket may be made of metal, either magnetic or nonmagnetic, or of insulating material, such as bakelite, if so desired.

One advantage of the present invention resides in its simplicity of construction which enables substantial savings in the cost of manufacture and maintenance.

Other objects, features and advantages will appear in the subsequent detailed disclosure.

In the accompanying drawing, wherein the same reference characters represent the same parts throughout the several views, Figure 1 illustrates, by way of example only, a plan view of an improved instrument in accordance with the present invention, with its case removed and the dial face partly cut away; Figure 2 illustrates a side view of Figure 1; Figure 3 shows a detailed view of the main supporting bracket having prongs attached thereto, and with the movable coil element and core removed; and Figure 3A illustrates the permanent magnet suitably drilled with holes for enabling the insertion of the prongs of the removable unit shown in Figure 3. Figure 3B illustrates, by way of example, a front perspective view of the mounting arrangement of Figure 3, with the exception that in this figure there are provided short screws, instead of prongs, for securing the mounting to the magnet.

Referring to the drawing in more detail, there is shown a D'Arsonval type of instrument comprising a circularly shaped permanent magnet 1 formed of a plurality of layers or laminations 2, and having poles which at their adjacent faces are recessed or curved concavely, preferably on the arc of a circle, as at 3, 4. Of course, if desired, any other form of magnet, such as a horseshoe magnet having separately affixed pole pieces, may be used.

Covering the upper surface of the magnet 1 is a dial face 5 having printed thereon any suitable scale, and over which an indicator or pointer 6 is adapted to move. Dial face 5 is arranged to be secured by means of two small screws 7 on opposite sides of the face to the raised parts of the wings or arms 12, 13 of the main supporting bracket 10, which supports the entire removable coil assemblage unit. This bracket, which is preferably made of metal, consists of an upper portion 11 recessed at its center and having outwardly extending arms 12 and 13, and a lower portion 14 protruding inwardly, both portions being joined by a fan-shaped center piece 15. Bridged across arms 12 and 13, and adapted to be fastened thereto by screw-like prongs 16 and 17 is a metallic bridging member 18, which, together with the lower portion 14 of the bracket 10, serves to hold the movable coil 19 in place. The core 20 is held in position by being attached, as by staking, to an arm 20a formed integral with the upper portion 11 of the supporting bracket 10 and extending from the central portion thereof midway of the outwardly extending arms 12 and 13. Coil 19 is arranged on a rectangular frame and extends around the core 20 so as to swing between the core and the pole faces 3 and 4, and is pivotally supported between the bent-up bridge member 18 and the lower portion 14 of bracket 10 in a manner well known in the art. Since the particular manner of pivotally mounting the coil in its bearings and providing suitable springs therefor forms no part of the present invention, per se, it will not be described herein.

In order to conveniently fasten bracket 10, which is adapted to support the entire coil assemblage, to the permanent magnet 1 there are shown provided the two prongs 16 and 17 which are arranged to pass through holes in the ends of bridge member 18 and to be screwed to the arms or wings 12 and 13 of the bracket 10 and to be freely inserted into holes 23 and 24 in the permanent magnet 1 for easy longitudinal movement therein. These prongs, which are insulated from metallic bridge member 18 by means of insulating washers 27, and are threaded throughout their length, are arranged to be rigidly fastened to magnet 1 by means of nuts 25 located on the under side of the magnet. If desired, these prongs may be considerably shortened in the manner shown in Figure 3B so as to constitute screws which, by means of suitably sized and threaded holes in the magnet, can be screwed thereto.

It may here be noted that the break in the laminations at the bottom of the permanent magnet, as indicated at 26 in the drawing, Figure 3A, is of sufficient width to permit easy passage of the neck of the lower portion 14 of the bracket 10 as the unit is moved into or out of position.

When the removable unit is mounted in the instrument, one terminal of the coil 19 may be connected through its upper spring to the pivotal pin 21 which electrically connects with bridge member 18 to whose end a connection may be brought, and the other terminal may be connected through its lower spring, herein shown as 28, Figure 2, to a metallic contact member 29 which is insulatingly positioned away from bracket 10 by fibre washers 30.

From the foregoing, it will be apparent that there is provided a conveniently removable coil assemblage unit which is rigid in construction and which enables the economical manufacturing and assembling of instruments, and the easy maintenance thereof.

It is to be distinctly understood that this invention is not limited to the precise arrangements shown, since various modifications may be made in the details of construction as regards, for example, the size of the screws and holes and their location, and type and shape of the mounting, without departing from the spirit and scope of the invention.

What is claimed is:

1. A removable coil assemblage unit for a D'Arsonval type of electrical measuring instrument comprising a main supporting bracket having an upper portion, two outwardly extending arms formed as extensions of said upper portion, a portion joined to said upper portion and extending downwardly therefrom at right angles thereto, a lower portion joined to the lower end of said downwardly extending portion and arranged parallel to and below the upper portion, a bearing plate arranged on the upper face of the upper portion, a pair of screws arranged parallel to each other and attaching the bearing plate to the upper portion, a magnetic core supported on said upper portion, and a movable coil surrounding said magnetic core and pivotally supported by the lower portion of the supporting bracket and the bearing plate.

2. A removable coil assemblage unit for a D'Arsonval type of electrical measuring instrument comprising a main supporting bracket having an upper portion, two outwardly extending arms formed as extensions of said upper portion, a portion joined to said upper portion and extending downwardly therefrom at right angles thereto, a lower portion joined to the lower end of said downwardly extending portion and arranged parallel to and below the upper portion, a bearing plate arranged on the upper face of the upper portion, a pair of screws arranged parallel to each other and attaching the bearing plate to the upper portion, a magnetic core supported on said upper portion, a movable coil surrounding said magnetic core and pivotally supported by the lower portion of the supporting bracket and the bearing plate, a dial plate secured to the outwardly extending arms, and an indicating hand secured to the movable coil and associated with the dial plate.

WALTER E. BEEDE.